Patented Nov. 28, 1933

1,937,280

UNITED STATES PATENT OFFICE 1,937,280

PLASTIC COMPOSITION

Marcel Jean Louis Ledru, Roussillon, Florentin Bidaud, Serezin, and Paul Berger, St. Fons, France, assignors to E. I. du Pont de Nemours & Company, Wilmington, Del., a corporation of Delaware No Drawing. Application March 16, 1932, Serial No. 599,334, and in Great Britain March 23, 1931

6 Claims. (Cl. 106—37)

This invention relates to compositions of matter containing cellulose derivatives and which are capable of being used in the varnish, film, celluloid, plastic substances and artificial silk industries.

In the German specification No. 122,272 it has been proposed to replace the camphor, used in the manufacture of celluloid, by aromatic sulphonic acid derivatives. Among the numerous products cited in that specification, sulphamides and their derivatives, particularly their alkylated derivatives, have become of technical importance in the industry of celluloid and of its substitutes, as these products are good plastifying and suppling agents.

We have found that N-alkylol sulphamides of benzene or its homologues are excellent plasticizers or softeners of cellulose derivatives, such as cellulosic esters or ethers. They possess, over sulphamides and their N-alkylated derivatives, the advantage of imparting to the compositions in which they are incorporated a greater suppleness and remarkable thermoplastic properties. Their incorporation consequently allows the preparation of plastic masses which can be easily worked when hot and in which the proportion of plastifying agent may be less than that generally used. The property of these N-alkylol sulphamides of being more capable of being associated with cellulosic derivatives is shown by the fact that it is possible to incorporate them in these derivatives in higher proportions without separation of the plastifying agent at the surface of the products obtained. This property is particularly advantageous in the manufacture of very supple and very adherent varnishes.

It is therefore an object of this invention to provide a composition of matter comprising, for example, a cellulose derivative, such as an ester, for instance, cellulose acetate, etc. or an ether, for example, ethyl or methyl cellulose and N-alkylol sulphamides of benzene or its homologues as a suppling, with or without other materials, such as fillers, coloring materials, pigments, fireproofing agents, etc.

Other objects will appear from the following description and appended claims.

In accordance with the principles of the instant invention N-alkylol sulphamides of benzene or its homologues or mixtures thereof are incorporated in any convenient manner in a composition of matter comprising a cellulose derivative.

The compositions containing N-alkylol sulphamides of benzene or its homologues can be employed in the various fields in which cellulose derivatives, such as cellulosic esters or ethers are made use of, and, particularly, in the varnish, the film, the celluloid, the plastic substances and the artificial silk industries.

The N-alkylol sulphamides of benzene or its homologues can be incorporated with the cellulosic materials, either alone or together with other suppling agents, with or without the addition of any other materials used in these industries, such as fillers, colouring matters, pigments, fireproofing agents, etc.

The N-alkylol sulphamides with which the present invention is concerned may be prepared according to the reaction described in the French Patent 657,860 by the action of glycol halohydrins on sulphamides of benzene or its homologues and, in this manner, according to the operative conditions, there are obtained mono-alkylol or di-alkylol sulphamides or their mixtures. These products can also be obtained, according to a known general method of preparation, by the action of olefine oxides on sulphamides, better results being often obtained in this manner. Instead of non-substituted sulphamides, their mono-substituted derivatives may also be used as a starting material.

The proportions of the ingredients constituting the composition may vary within wide limits depending partly on the final product desired and the industry or art to which it relates. Satisfactory results have been secured when up to 50% by weight or more of the plasticizer is used.

Hereafter there is set forth several specific embodiments illustrating the principles of the instant invention. It is to be understood that these specific examples are not intended to restrict the invention thereto. In the examples the parts are by weight.

*Example I.*—215 parts of paratoluene-sulphamide are brought into reaction with 210 parts of glycol chlorhydrin, in the presence of 600 parts of water and 100 parts of caustic soda, in a closed vessel at a moderate temperature. After two days, the resulting mixture is cooled and filtered. There remains on the filter a crystalline substance, insoluble in water, soluble in acetone, chloroform and various organic solvents. The product so prepared, incorporated with cellulose acetate in the proportion of 25%, gives supple films.

Instead of directly using the crude product, the toluene-alkylol-sulphamide, i. e. para-toluene-diethylol-sulphamide, which is its principal constituent, may be extracted by purification of the crystals. The purified product is also capable of being easily incorporated with cellulose acetate.

*Example II.*—85 parts of paratoluene-sulphamide are mixed with 470 parts of caustic soda lye of 4.3% concentration and ethylene oxide is passed through the mixture, at ordinary temperature, until absorption ceases. The resulting product is then acidulated with sulphuric acid and the almost colourless oil which separates is decanted. This oil, which is crude paratoluene mono-hydroxy-ethylsulphamide, and the quantity of which is approximately the theoretical yield, is capable of crystallizing. It may be purified by distillation in vacuum. It distills at about 210° C. under a pressure of 0.3 mm. of mercury; it melts at about 46° C.

The crude or purified product so obtained, incorporated with half its weight of commercial cellulose acetate or of ethyl celulose, gives very supple varnishes. It is capable of being incorporated with a large number of cellulosic derivatives, esters or ethers, alone or mixed with other camphor substitutes. Particularly, it may be incorporated with the primary products obtained by acetylation of cellulose, giving supple films when in proportion of 50%, for example. It gives also excellent results with cellulose triacetates slightly de-acetylated or hydrolyzed, a collodion formed of 15 parts of cellulose acetate containing 61% acetic acid, for example, with 15 parts of the product described above, and 80 parts of a chloroform-alcohol mixture or other suitable solvent, gives, by evaporation, a film exceedingly supple and strong. By introducing this product in plastic substances, it is possible to incorporate with them other products or proportions of other products which could not be added in the absence of this product.

*Example III.*—A mixture of 40 parts of benzene sulphamide, 74 parts of water, 67 parts of caustic soda lye at 36° Bé. and 41 parts of glycol monochlorhydrin are cohobated for 5 hours. An oil separates which is soluble in boiling water and acetone, and consists principally of benzene ethylol-sulphamide.

This substance is an excellent substitute for camphor and is perfectly incorporated with cellulose triacetate or with commercial cellulose acetate, or with the other cellulosic esters or ethers. A collodion containing, for example, 1 part of ethyl cellulose and 1 part of benzene ethylolsulphamide, dissolved in a mixture of 6 parts of ethyl alcohol and 4 parts of benzene, gives, by evaporation, a brilliant smooth elastic film, the suppleness of which is extraordinary. This suppling agent may also be utilized in the manufacture of plastic masses adapted for moulding, the basis of which is cellulosic esters or ethers, and allows, for example, by incorporation with acetyl or ethyl cellulose, to obtain, if desired, masses which can be injected at low temperature.

*Example IV.*—By replacing in Example I paratoluene sulphamide by the corresponding molecular proportion of mono-ethyl-paratoluene sulphamide, paratoluene ethyl ethylol sulphamide is obtained, which is an excellent substitute for camphor.

Since it is obvious that various changes and modifications may be made in the above description without departing from the nature and spirit thereof, this invention is not restricted thereto except as defined in the appended claims.

We claim:

1. A cellulosic composition comprising a cellulose derivative and an N-alkylol sulphamide of benzene or a homologue thereof as a suppling agent.

2. A cellulosic composition comprising a cellulose ester and an N-alkylol sulphamide of benzene or a homologue thereof as a suppling agent.

3. A cellulosic composition comprising a cellulose ether and an N-alkylol sulphamide of benzene or a homologue thereof as a suppling agent.

4. A cellulosic composition comprising a cellulose derivative and para-toluene-diethylol-sulphamide as a suppling agent.

5. A cellulosic composition comprising a cellulose derivative and benzene-ethylol-sulphamide as a suppling agent.

6. A cellulosic composition comprising a cellulose derivative and para-toluene-ethyl ethylolsulphamide as a suppling agent.

MARCEL JEAN LOUIS LEDRU.
FLORENTIN BIDAUD.
PAUL BERGER.